J. H. KLEPPINGER.
Vehicle-Spring.
No. 223,149.　　　　　Patented Dec. 30, 1879.
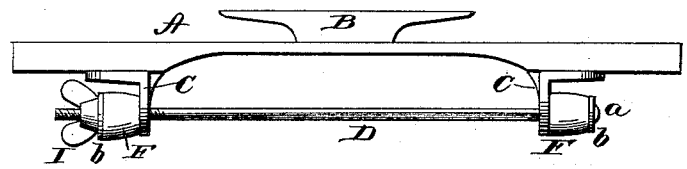
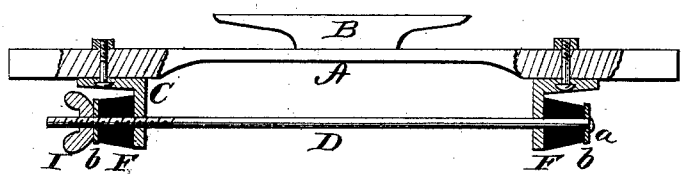
WITNESSES　　　　　　　　　　　　　　INVENTOR

UNITED STATES PATENT OFFICE.

JOSEPH H. KLEPPINGER, OF CHERRYVILLE, ASSIGNOR OF TWO-THIRDS OF HIS RIGHT TO GEORGE H. KLEPPINGER, OF LEHIGH TOWNSHIP, NORTHAMPTON COUNTY, PENNSYLVANIA.

IMPROVEMENT IN VEHICLE-SPRINGS.

Specification forming part of Letters Patent No. 223,149, dated December 30, 1879; application filed May 10, 1879.

*To all whom it may concern:*

Be it known that I, JOSEPH H. KLEPPINGER, of Cherryville, in the county of Northampton, and in the State of Pennsylvania, have invented certain new and useful Improvements in Vehicle-Springs; and I do hereby declare that the following is a full, clear, and exact description thereof, reference being had to the accompanying drawings, and to the letters of reference marked thereon, making a part of this specification.

The nature of my invention relates to vehicle-springs; and it consists in the construction and combination of parts, as will be hereinafter more fully set forth, and pointed out in the claim.

In order to enable others skilled in the art to which my invention appertains to make and use the same, I will now proceed to describe its construction and operation, referring to the annexed drawings, in which—

Figure 1 is a side view of my invention. Fig. 2 is a detailed section of the same.

A represents a wooden slat or side bar, which is to be connected to the rear axle and front head-block of a vehicle, and is provided in the center with a suitable block, B, for supporting the body of the vehicle. To the under side of the slat A are secured two angle-irons or hangers, C C, through which is passed a rod, D, running parallel with the slat. On each end of the rod D is placed a rubber block, F, one end of which bears against the outer side of the hanger, one of said rubber blocks being held by a head, a, on one end of the rod, and the other by a thumb-nut, I, screwed on the other end of the rod.

Washers b b are interposed at the outer ends of the rubber blocks. The tension of the rubber blocks can be easily regulated by the thumb-nut I.

This forms a cheap and easy-riding carriage-spring, which is not liable to get out of order.

Having thus fully described my invention, what I claim as new, and desire to secure by Letters Patent, is—

In combination with the slat A, the two L-shaped hangers C C, the headed rod D, passing through the vertical arms of the hangers, the rubber blocks F F, and the tension-regulating thumb-screw I, all constructed and arranged substantially as and for the purposes herein set forth.

In testimony that I claim the foregoing I have hereunto set my hand this 24th day of August, 1878.

JOSEPH H. KLEPPINGER.

Witnesses:
    JOHN M. HOWES,
    A. W. LERCH.